(12) United States Patent
Confuorto et al.

(10) Patent No.: US 6,551,565 B2
(45) Date of Patent: Apr. 22, 2003

(54) PROCESS OF REMOVING NITROGEN OXIDES FROM FLUE GASES FROM A FLUIDIZED CATALYTIC CRACKING UNIT

(75) Inventors: Nicholas Confuorto, Hillsborough, NJ (US); Kevin R. Gilman, Annandale, NJ (US)

(73) Assignee: Belco, Parsippany, NJ (US)

( * ) Notice: Subject to any disclaimer, the term of this patent is extended or adjusted under 35 U.S.C. 154(b) by 316 days.

(21) Appl. No.: 09/729,716

(22) Filed: Dec. 6, 2000

(65) Prior Publication Data
US 2002/0068031 A1 Jun. 6, 2002

(51) Int. Cl.⁷ .................................................. B01J 8/00
(52) U.S. Cl. .................................................. 423/239.1
(58) Field of Search ............................. 423/235, 239.1, 423/385, 405

(56) References Cited

U.S. PATENT DOCUMENTS

| | | | | | |
|---|---|---|---|---|---|
| 4,350,615 | A | * | 9/1982 | Meguerian et al. | 502/66 |
| 4,617,175 | A | * | 10/1986 | Tolpin et al. | 422/171 |
| 4,765,258 | A | * | 8/1988 | Zauderer | 110/347 |
| 6,398,851 | B1 | * | 6/2002 | Bose | 95/273 |

* cited by examiner

*Primary Examiner*—Stanley S. Silverman
*Assistant Examiner*—Edward M. Johnson
(74) *Attorney, Agent, or Firm*—Dowell & Dowell, P.C.

(57) ABSTRACT

A process for removing nitrogen oxides from flue gases of a fluidized catalytic cracking unit wherein the flue gas is introduced into a tertiary cyclone with percentages of separated solids being discharged in both the overflow and underflow from the cyclone, treating the overflow in a catalytic reduction unit to form an outlet gas and treating the underflow and outlet gas in a wet scrubber.

9 Claims, 3 Drawing Sheets

PROCESS OF REMOVING NITROGEN OXIDES FROM FLUE GASES FROM A FLUIDIZED CATALYTIC CRACKING UNIT

BACKGROUND OF THE INVENTION

1. Field of the Invention

The field of the invention is fluidized catalytic cracking (FCC) of heavy hydrocarbon feeds and selective catalytic reduction (SCR) of nitrogen oxides from a FCC regenerator.

2. Description of Related Art

Catalytic cracking is the backbone of many refineries. It converts heavy feeds into lighter products by catalytically cracking large petroleum molecules into smaller molecules. Catalytic cracking operates at low pressures, without hydrogen addition, in contrast to hydrocracking, which operates at high hydrogen partial pressures.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hydrocarbon feed vaporizes and the hot catalyst cracks the feed at 425° C.–600° C., usually 460.° C.–560.° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, approximately, 500° C.–900° C., usually 600° C.–750° C. This heated catalyst is recycled to the cracking reactor to crack more fresh feed. Flue gas formed by burning coke in the regenerator may be treated for conversion of carbon monoxide in the regenerator for a full burn unit or in a CO boiler for a partial burn unit. In a full burn unit the flue gas temperature is normally reduced by a heat recovery system. After the heat recovery system or the CO boiler, the flue gas is normally discharged into the atmosphere or treated with an air pollution control system and then discharged to the atmosphere.

Catalytic cracking is endothermic. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 1940s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to $CO_2$ within the regenerator (to conserve heat and reduce air pollution) many FCC operators add a CO combustion promoter. U.S. Pat. Nos. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Catalyst regeneration usually causes formation of NOx, either in the regenerator, if operating in full CO combustion mode or in a downstream CO boiler, if operating in partial CO combustion mode. NOx emissions are becoming more of a problem, as FCC units are being forced to process lower quality feeds containing more NOx precursors, and as environmental regulations become more strict.

There are many approaches towards operating the FCC unit to reduce NOx emission, various catalyst additives, segregated cracking of different feeds, and regenerator modifications. These are all helpful, but can only achieve a modest reduction in NOx emissions. Some refiners have to do more or increasingly anticipate the need to do more, and now resort to flue gas treatments to remove NOx. There are commercially proven two primary NOx flue gas treatments commercially available, thermal and catalytic.

Thermal destruction of nitrogen oxides (DENOx) involves operation at 870° C.–980° C. with urea or ammonia addition to reduce NOx. Capital costs can be moderately high, because of the high temperatures, and operating costs can be higher than desired, again because a large volume gas stream must be heated in the case of a full CO combustion FCC. Thermal DENOx is preferred by many refiners for FCC use because it works with no catalyst. A drawback to this approach is that the maximum amount of NOx reduction achievable is typically about 50%. This is often denoted as the SNCR process. Catalytic reduction of NOx, the SCR process, is a proven technology used to reduce NOx emission for many refinery processes. It operates at moderate temperatures, well below those of FCC regenerators, so operating costs are moderate. It adds a roughly stoichiometric amount of ammonia to a NOx containing flue gas stream and relies on a catalyst, usually honeycomb monoliths, to promote the reduction of NOx by NH3. The process works well with flue gas from furnaces, which can have moderate amounts of NOx and other gaseous pollutants, but are relatively free of particulates.

However, because the catalyst must be protected from fouling by catalyst particles, SCR units need to be located downstream of the third stage separator or even sometimes after an ESP that will reduce the particle loading below 50 mg/Nm3. The ESP may be used to protect the SCR and/or may also be used in order to reduce the particulate emissions into the atmosphere as a requirement in the environmental permit for an oil refinery. In either case, an ESP lacks the capability to operate reliably over the length of time required by a lot of oil refiners for best economical practice. Typically, refiners operate the FCC 3 to 5 years between turnarounds without opportunity for an ESP outage. Third Stage Separators (TSSs) have often been used to protect FCC turbo-expanders from catalyst abrasion and in one case was used to protect an SCR. TSSs have a relatively low cost and are reliable; however, the drawback of TSSs for the case of stack emissions is that the TSS underflow (usually about 3% of the total gas flow) must be further treated or, if not further treated, the flue gas emitted at the stack will have the same catalyst load as before treatment with the TSS.

The equipment used for treatment of TSS underflow would normally be a fourth stage cyclone or a ceramic filter designed for high temperature. A fourth stage cyclone typically only removes about 75% of the catalyst particles from the TSS underflow resulting in an ultimate catalyst emission of >25% of the original catalyst emission before TSS treatment. This is too much to be eventually discharged to the environment. The ceramic filter is efficient at removing catalyst at essentially 100% but the cost and reliability for continuous operation make it less attractive in many cases. The ceramic filter has only been used on a small number of FCC TSS applications. Another problem associated with the filter is that it is a piece of equipment which is more prone to shutdowns, and corrosion problems have been associated with shutdowns, because sulfuric acid will condense when temperature is lowered.

In today's modern refineries, stack emission concerns for the FCC are mainly particulate (catalyst), SOx, and NOx. NOx is a more recent concern worldwide (as for Japan in the past) and is now the target of a large number of environmental regulators. SOx emissions can be removed in several ways including:

1) SOx reduction additive can be added to the FCC catalyst.
2) Pretreating the feed by hydrocracking or hydrotreating before introduction of oil to the FCC.
3) Operating on lower sulfur crudes.
4) Wet scrubbing with an alkali after the FCC to absorb SOx from the gas. The drawbacks of 1) to 3) above are:
 1) SOx reduction catalyst—can be expensive and often cannot meet recent permit requirements.
 2) Hydrocracking/Hydrotreating—generally very expensive and usually only economical only if final product sulfur requirements dictate this treatment and not the FCC stack emissions.
 3) Lower sulfur crudes —reduces refinery margins so it is deemed uneconomical.

Since wet scrubbers can be used to remove both particulate and SOx concurrently, one may propose that a typical process for removal of all three pollutants would consist of a wet scrubber for SOx and particulate control followed by an SCR for NOx control. Optimum temperature for SCR, however, is much higher than the adiabatic quench temperature of a wet scrubber. Therefore, in order to utilize a wet scrubber and SCR in the order proposed, a reheat system would be required with additional capital/operating costs, significant real estate requirements, and questionable long-term reliability.

BRIEF SUMMARY OF THE INVENTION

The present invention provides a fluidized catalytic cracking flue gas cleaning process wherein the flue gas from the said process is passed to a third stage cyclone separator; wherein the overflow of the third stage separator is connected to an SCR catalytic unit; wherein the underflow of the third stage separator containing both the recovered solids and the gas is remixed to the outlet of the SCR; wherein the resulting gas mixture is fed to a wet scrubber that will remove more than 90% of the sulfur dioxide and more than 80% of all solid particles greater than 3 microns.

As a variant, the underflow of the third stage is fed to a fourth stage and the overflow of the fourth stage separator is remixed with the outlet of the SCR; wherein the resulting gas mixture is fed to a wet scrubber that will remove more than 90 of the sulfur dioxide and more than 80% of all solid particles greater than 3 microns. With such an embodiment, since the wet scrubber will remove the fine dust, there is no need to install a gas solid separator like a ceramic filter on the underflow of the third stage separator, thus providing a substantial economy.

DETAILED DESCRIPTION

The present invention can be better understood by reviewing it in conjunction with a conventional cracking FCC unit.

In fact, the presence of an ESP is redundant if a wet scrubber is already required to remove SOx since a wet scrubber can reduce particulate and SOx.

This invention proposes to use a Third Stage Separator (TSS) as the first treatment operation in the air pollution control system following a CO Boiler or heat recovery system for oil refinery FCC flue gas. Modern TSSs have low capital cost, can achieve an overflow containing less than 70 mg/NM3 of catalyst in order to protect the SCR, and are reliable. This has been done in one installation already; however, in this invention the underflow from the TSS would be directed around the SCR and would be re-injected into the flue gas duct after the SCR without requirement for a $4^{th}$ stage cyclone or ceramic filter. The relatively clean TSS overflow would pass through the SCR to be treated for NOx and would rejoin the dirty TSS underflow gas downstream of the SCR. The combined gas stream would then enter a wet scrubber where particulate and SOx are removed concurrently. Although the TSS performs a redundant particulate operation, it has a lower capital cost than an ESP. This configuration allows the wet scrubber to make use of its dual capabilities (particulate and SOx removal), avoids expensive reheat, avoids an unreliable ESP, and addresses all three pollutants in a reliable manner consistent with oil refinery requirements.

Figure 1:
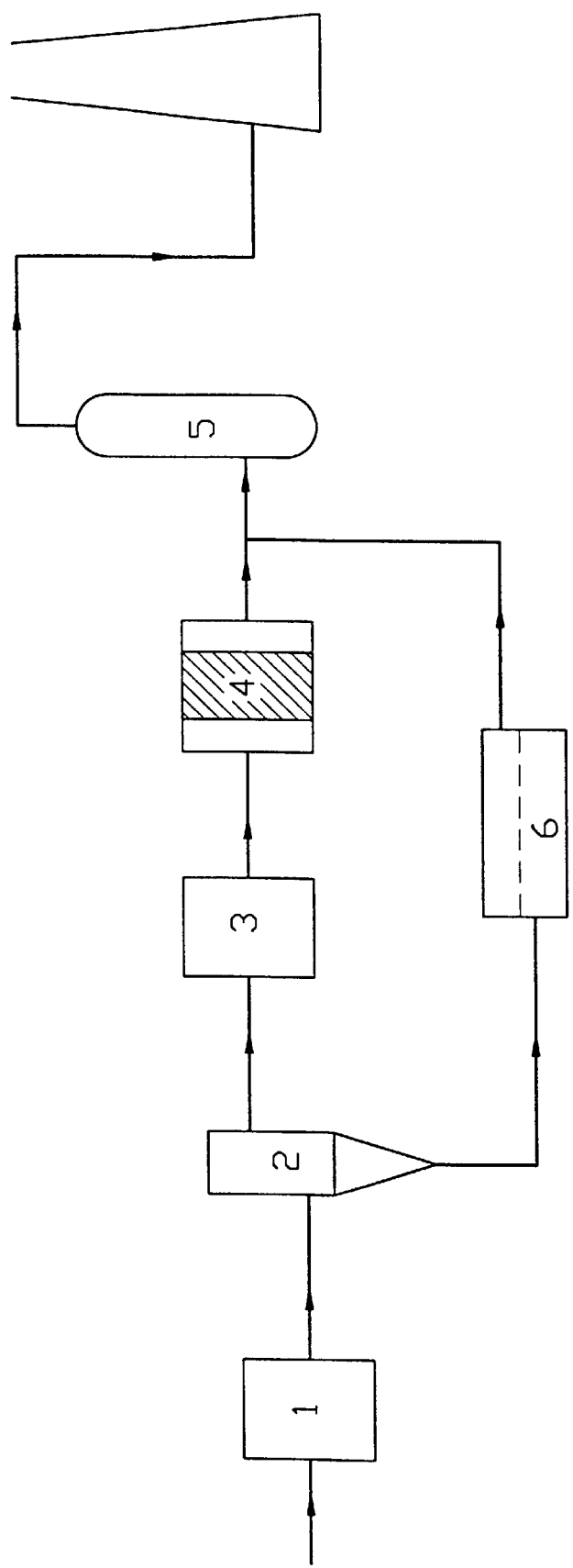
FIG. 1 is a schematic view of an FCC unit of the prior art with the regenerator 1, the third stage separator 2 and its associated filter 6, a heat recovery unit or a CO boiler 3, a SCR unit 4 for DeNOx and an optional scrubber 5 for SO2 control.
Figure 2:
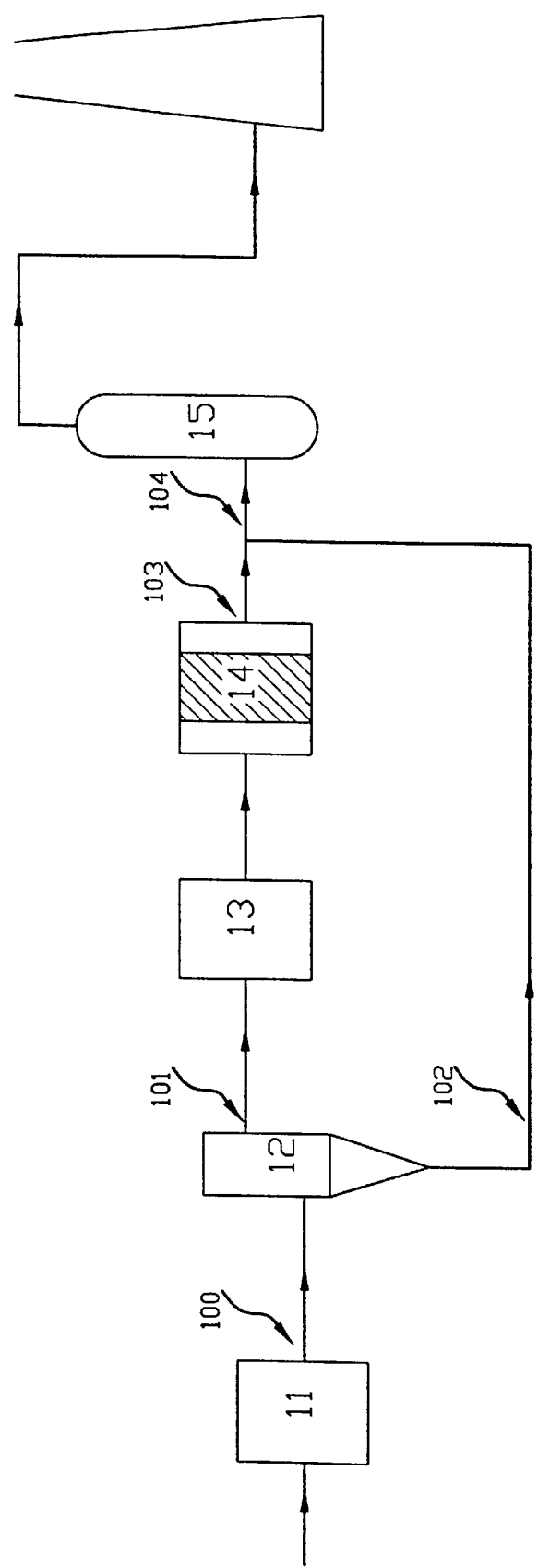
FIG. 2 is a schematic view of an FCC unit with the regenerator 1, the third stage separator 2, an heat recovery unit or a CO boiler 3, a SCR unit 4 for DeNOx and scrubber 5 for SO2 and particle control.

The invention can be better understood by referring to FIG. 2, given as an example. The flue gas 100 leaving the regenerator 11 is cleaned of most of the dust by devices like primary and secondary cyclones, not represented on the drawing, and fed to a tertiary cyclone separator 12; this tertiary cyclone separator 12 will be referred to as TSS hereunder. The overflow 101 of the TSS that would typically contain less than 250 mg/Nm3, dry basis, of dust, and preferably between 50 and 100 mg/Nm3 will be fed to a heat recovery unit or a CO boiler 13 and then to a SCR unit 14. A reagent, like ammonia or urea, not represented on the drawing is also fed to the SCR. In order to stabilize the TSS behavior, and thus enhance its separation efficiency, a small fraction of the total gas flow fed, is allowed to escape with the collected dust through the cyclone underflow. Typically the underflow to feed gas flowrate is in the range of 0.5 to 6%, preferably in the range of 2 to 4% on a weight basis. This stream (102) contains all the removed dust and will be reintroduced to the scrubber after mixing with stream (103) from the SCR, yielding stream (104). As a variant not represented on the drawing, streams (102) and (103) are not mixed but separately introduced in the scrubber (5). According to the invention, the scrubber will have a good separation efficiency for the collection of dust particles. Typically it would remove more than 80 of FCC catalyst of 3-micron size and more than 30% of the 1.5-micron size. Still according to the invention the collected particles are eliminated with the scrubber bleed, not represented.

Figure 3:
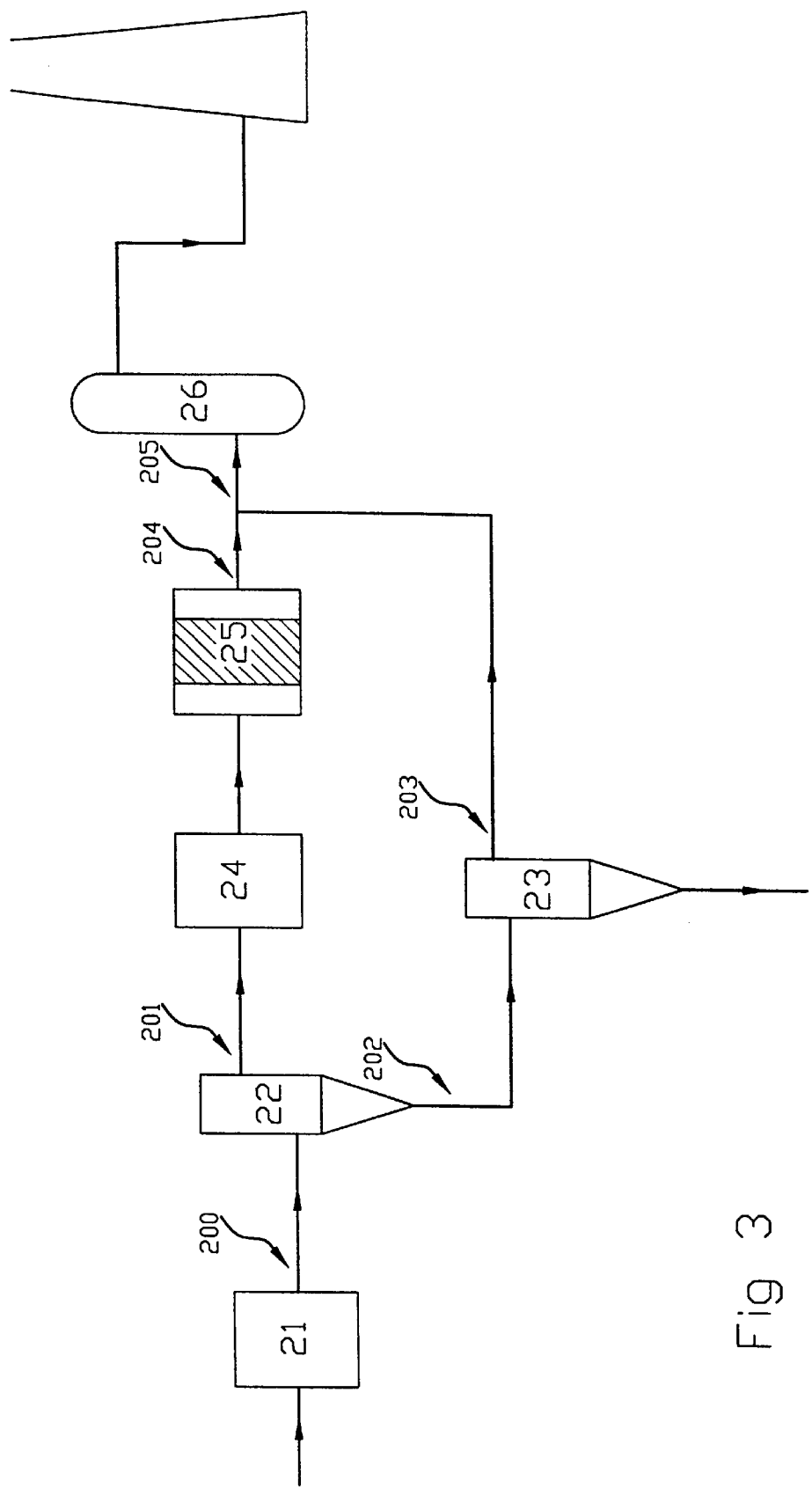
FIG. 3 is a schematic view of another embodiment of an FCC unit in accordance with the invention.

As a variant, as shown in FIG. 3, the flue gas 200 leaving the regenerator 21 is cleaned of most of the dust by devices like primary and secondary cyclones, not represented on the drawing, and fed to a tertiary cyclone separator 22; this tertiary cyclone separator 22 will be referred to as TSS hereunder. The overflow 201 of the TSS that would typically contain less than 250 mg/Nm3, dry basis, of dust, and preferably between 50 and 100 mg/Nm3 will be fed to a heat recovery unit or a CO boiler 24 and then to a SCR unit 25. A reagent, like ammonia or urea, not represented on the drawing is also fed to the SCR unit. In order to stabilize the TSS behavior, and thus enhance its separation efficiency, a small fraction of the total gas flow fed, is allowed to escape with the collected dust through the cyclone underflow. Typically the underflow to feed gas flowrate is in the range of 0.5 to 6%, preferably in the range of 2 to 4% on a weight basis. This stream (202) contains all the removed dust and would be fed to another cyclonic device, the fourth stage separator (FSS) 24. The FSS can be, for example a cyclone or a battery of cyclones. The overflow 203 of this FSS will be reintroduced to the scrubber after mixing with stream (204) from the SCR, yielding stream (205). As a variant not represented on the drawing, streams (203) and (204) are not mixed but separately introduced in the scrubber 26. According to the invention, the scrubber will have a good separation efficiency for the collection of dust particles. Typically it would remove more than 80% of FCC catalyst of 3-micron size and more than 30% of the 1.5-micron size.

In another variant of the above invention, only a fraction of the solids collected by the TSS is re-entrained with the gas allowed to escape with the underflow. With such an embodiment, the fraction of the collected solids that can be easily recovered in the hopper of the TSS need not be collected in the scrubber.

What is claimed is:

1. A process for removing nitrogen oxides from flue gas issuing from a regenerator of a fluidized catalytic cracking unit wherein the flue gas are cleaned of substantial amounts of dust in the regenerator, the process comprising the steps of:

a) directing the flue gas into a tertiary cyclone and separating the solids therefrom so that not more than generally 250 mg/Nm3 of solids exit in an overflow from the tertiary cyclone and causing a minor percentage of flue gas entering the tertiary cyclone to exit as an underflow from the tertiary cyclone with solids separated in the tertiary cyclone;

b) Conveying the overflow to a selective catalytic reduction unit and processing the to overflow in the selective catalytic reduction unit to form an outlet gas stream; and c) Introducing the outlet gas stream and the underflow into a wet scrubber and removing at least approximately 80 of particles of 3.0 microns size and larger and 30% of 1.5 micron size.

2. The process of claim 1 in which not more than generally 50 mg/Nm3 to 100 mg/Nm3 of solids is removed from the tertiary cyclone in the overflow.

3. The process of claim 1 in which the total fraction of flue gas exiting with the underflow is between 1% and 6% based upon mass of the flue gas entering the tertiary cyclone.

4. The process of claim 3 in which the fraction of flue gas in the underflow is between 2% and 4% based upon mass of the flue gas entering the tertiary cyclone.

5. The process of claim 1 in which the underflow from the tertiary cyclone including separated solids is conveyed to a fourth stage separator of a cyclone type prior to being introduced into the wet scrubber.

6. The process of claim 5 in which the fraction of solids in the underflow is equal to between 50% and 100% of the solids entering the tertiary cyclone.

7. The process of claim 5 wherein the overflow is conveyed through a heat recovery unit before being conveyed to the selective catalytic unit.

8. The process of claim 1 in which the fraction of solids in the underflow is equal to between 50% and 100% of the solids entering the tertiary cyclone.

9. The process of claim 1 wherein the overflow is conveyed through a heat recovery unit before being conveyed to the selective catalytic unit.

* * * * *